United States Patent [19]

Wagner

[11] 4,040,738
[45] Aug. 9, 1977

[54] RAILROAD TRACK PROFILE SPACING AND ALIGNMENT APPARATUS

[75] Inventor: Herbert A. Wagner, Corona Del Mar, Calif.

[73] Assignee: Gulton Industries, Inc., Metuchen, N.J.

[21] Appl. No.: 560,539

[22] Filed: Mar. 20, 1975

[51] Int. Cl.² .......................... G01C 3/00; E01B 29/04
[52] U.S. Cl. .......................................... 356/1; 33/287; 356/4
[58] Field of Search .......................... 33/287; 356/1, 4

[56] References Cited

U.S. PATENT DOCUMENTS

| | | | |
|---|---|---|---|
| 3,562,419 | 2/1971 | Stewart et al. | 178/DIG. 36 |
| 3,679,307 | 7/1972 | Zoot | 356/1 |
| 3,723,003 | 3/1973 | Vockenhuber | 356/4 |
| 3,778,157 | 12/1973 | Brelot et al. | 356/1 |
| 3,864,039 | 2/1975 | Wilmarth | 33/287 |
| 3,885,872 | 5/1975 | Howe, Jr. et al. | 356/1 |
| 3,899,251 | 8/1975 | Frenk et al. | 356/4 |

Primary Examiner—Maynard R. Wilbur
Assistant Examiner—S. C. Buczinski

Attorney, Agent, or Firm—Wallenstein, Spangenberg, Hattis & Strampel

[57] ABSTRACT

Apparatus for sensing the profile, spacing and/or alignment of railroad tracks comprising one or more assemblies or pairs of range sensor units, preferably at least one directing a light image upon the top surface of a track rail and at least one directing a similar light image on the lateral side surface of the track rail. Each of the range sensor units includes optical sensing means positioned for receiving only the diffused image reflected upon the associated rail surface along a given axis making preferably a substantial angle to the axis along which the light image is directed upon the rail surface. The axes preferably lie in a plane extending longitudinally of the rail and make a substantial angle to both the vertical and horizontal planes. One or more pairs of range sensor units like that referred to which direct light images on the top and side surfaces of the same rail are preferably enclosed in a common sealed housing having windows for receiving respectively the projected and reflected light images directed upon and reflected from the top and side rail surfaces. A shield which is preferably provided which shields the range sensor units from appreciable stray light, dirt and the like.

18 Claims, 13 Drawing Figures

RAILROAD TRACK PROFILE SPACING AND ALIGNMENT APPARATUS

BACKGROUND OF INVENTION

This invention relates to a railroad car-mounted track analyzer suitable for measuring the shape and relative position of the two rails from a car moving along the railroad track. Some analyzers measure the motion of the car as it moves along the rails or the motion of its trucks, and relate such motion to the shape of the tracks. Others measure the distance from points of the car to the rail. Since the body of the car, being supported by springs, moves laterally and vertically by quite a few inches relative to the rails, particularly on curves, the range sensors generally are mounted on the trucks which follow the rail quite closely.

The measurement of the track gauge requires only two range sensors, one for the left and one for the right rail. For measuring the horizontal straightness or curvature of the rail, three range sensors, spaced apart in longitudinal direction, are mounted on a bar fastened to the truck for measuring the three horizontal distances. Three such sensors spaced in a vertical direction are used to determine the curvature in vertical direction. The attainable accuracy using these prior analyzers is moderate. In order to prevent unmanageably large distance variations in curves, quite short longitudinal distances between the range sensors are chosen, say, less than 10 feet.

All tracks have some structural features making the design of the range sensors difficult, such as guide rails used in curved track and at railroad crossings and switches. These guide rails limit the space available for conventional horizontal range finders to less than two inches. Furthermore, fast moving cars tend to lift small rocks from the road bed which can damage the sensors.

Various techniques are used for sensing the range to a rail. Usually a light projection system is utilized where a light beam is directed against a light receiving unit or masking element and either the support for the light source, light receiving unit or masking element is mounted on a frame carrying rollers which must be kept in contact with the rails. However, measurements made with such a range sensing system are frequently inaccurate or difficult to make because the rollers tend to bounce and are subject to wear. A contact-free type of sensor has been developed which measures the electrical capacity between truck-mounted metal plates and the rails. This is a very noise-sensitive instrument not suitable for electrically operated railroads, and the relationship between capacity and range is highly nonlinear unless the range variations are very small.

SUMMARY OF INVENTION

The present invention provides railroad car-mounted optical range sensing units to measure the distance between each range sensor unit and the top and side surfaces of each rail. Each range sensor unit includes an optical system which projects an image of a light source, preferably a laser beam source, onto the horizontal or vertical surface of a track rail and obtains an indication of the points on a projection plane struck by the rail reflected image or, preferably through a servo balancing system, the degree of movement of the optical systems needed to maintain the reflected image approximately at a reference point on the projection plane. While, in accordance with a broad aspect of the invention, the light projection and light receiving apparatus may be positioned in the projection plane so that the light receiving apparatus receives both diffuse and specular reflections of the light image, the reliability and accuracy of the measuring system is greatly facilitated by positioning the light receiving apparatus so that it cannot receive the specular reflections from the rail surface.

It is believed that no one has heretofore utilized a light beam reflected off of a railroad track rail to measure the distance between a reference point on a railroad car and the track for a number of reasons. In the first place, since the top and side surfaces of the track rail are not infrequently pitted or rusty, the resulting irregular specular reflections would be an unreliable indication of variation in track profile or alignment. In the second place, it probably has not heretofore occurred to designers of equippment for measuring track shape and position that any useful reflections could be achieved from the weak diffuse reflections from track rail surfaces.

The rail surface distance measuring system of the invention is thus contact-free, is capable of measuring the variation of comparatively long distances with great accuracy, can be mounted in a safe distance from all track features and is easily shielded against flying debris. Moreover, the output of the system is highly noise insensitive, linear and can be directly processed by a digital computer. It can easily be made light enough so it can be easily and accurately moved in any direction by servo motors and can cover large variations of range to the rail from a point of the car body or from a long bar fastened to the trucks, as is needed.

EXEMPLARY EMBODIMENT OF THE INVENTION

Figure 1:
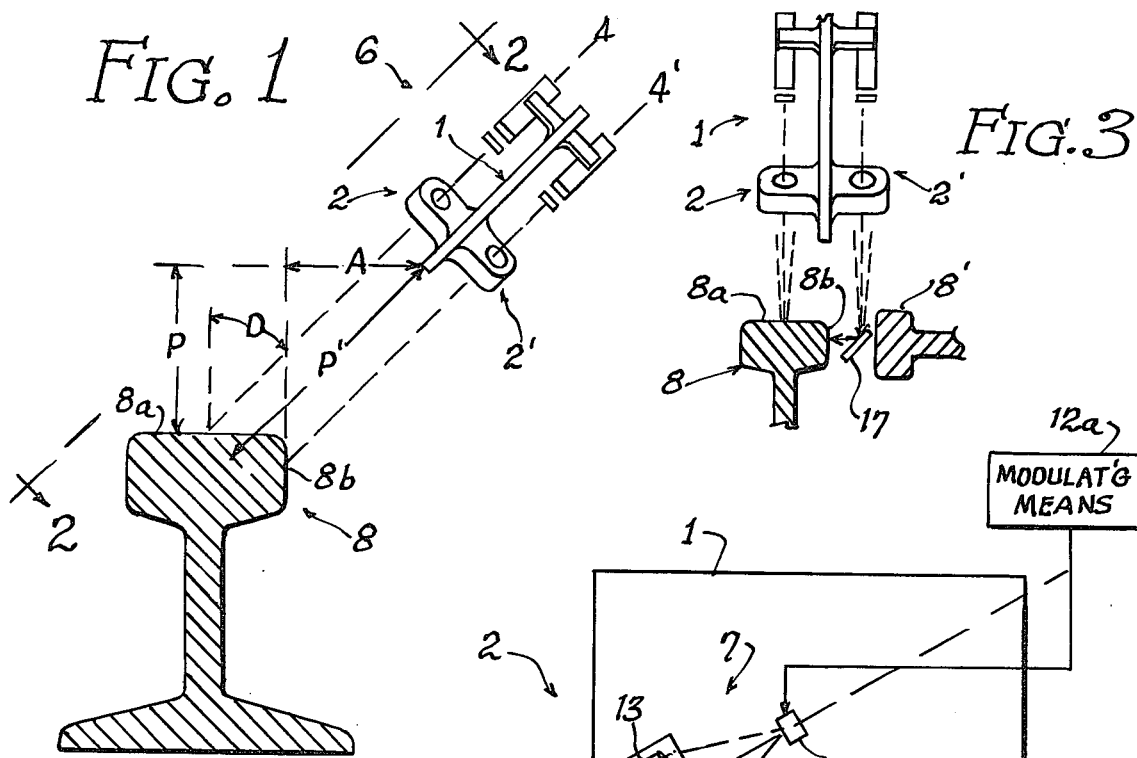
FIG. 1 is a vertical sectional view through a railroad track rail and shows a pair of range sensor units of the invention supported on a common frame and directing focused light images respectively upon the top and side surfaces of the rail.
Figure 2:
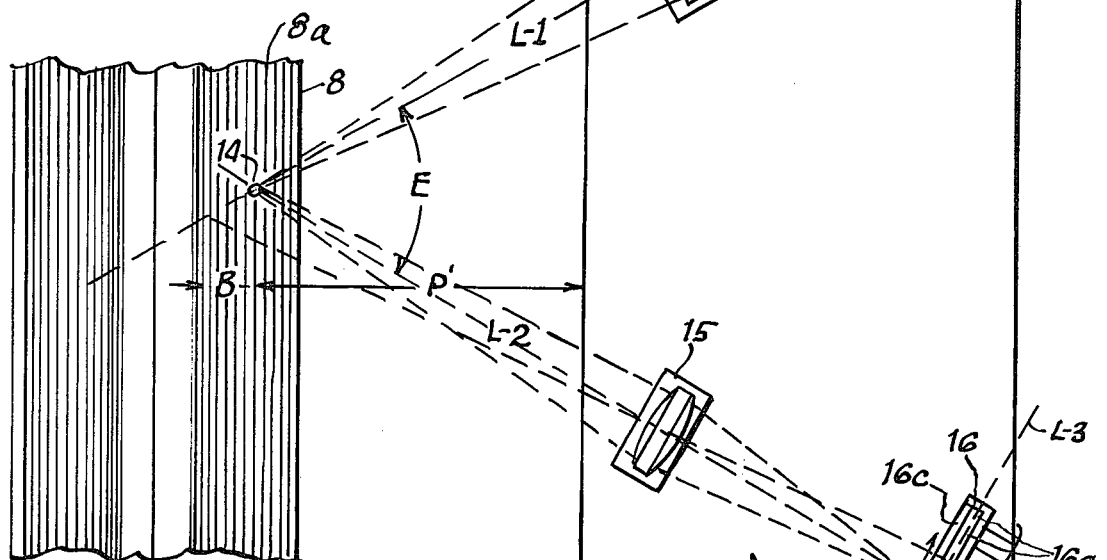
FIG. 2 is a view of the rail and range sensor units of FIG. 1, as seen along viewing plane 2—2 in FIG. 1.

FIG. 1 shows a pair of range sensor units mounted on a common base 1. One range sensor unit, to be referred to as the profile range sensor unit 2, measures the vertical distance P from a point on the base 1 to the top surface 8a of a rail 8; the other range sensor unit, to be referred to as the alignment range sensor unit 2', measures the horizontal distance A from a point on the base 1 to the vertical inner face 8b of the rail. The range sensor units 2 and 2', which are essentially of the same design, have optical planes 4 and 4' containing the axes of their optical systems. The optical planes 4 and 4' are most advantageous-16 at an angle both to vertical and horizontal reference planes. FIG. 2 shows, as an example of the present invention, the profile range sensor unit 2 as seen in direction 6 (FIG. 1) normal to its plane 4 of triangulation.

The profile range sensor unit 2 (as does the other range sensor unit 2') includes a projector 7 having an optical axis L1 and a detecting instrument 9 having an optical axis L2. These two optical axes lie in the triangulation plane 4 which is oblique to the top rail surface 8a, and intersect in the vicinity of the top surface 8a of the rail 8, so it is impossible for the range sensor units 2 and 2' to receive a light image by specular reflection. These axes enclose a large angle E, say, at least about 10°, but preferably at least 45° ro 90°. Mounted on the base 1 on the optical axis L1 of the projector 7 is a small light source 12 and an optical collecting means exemplified by the lens 13. The projector 7 is designed to project an image 14 of the light source 12 onto the top surface 8a of the rail 8. (A similar projector for the alignment range sensor unit 3 projects a similar image on the inner face 8b of the rail 8.)

The detecting instrument 9, also mounted on the base 1, includes an optical collecting means exemplified by the lens 15 for projecting the light image 14 onto a sensing means, preferably a position-sensing photocell array 16, which senses position variations C of the projection onto the photocell of the image 14 related to variations B of the distance P' to the rail. This distance equals P/cos D. As the distance P' or P varies, the path followed by the reflected image varies, so that the point on the photocell array 16 struck by the beam varies along a line L3 in the optical plane transverse to the optional axis L2.

Figure 3:
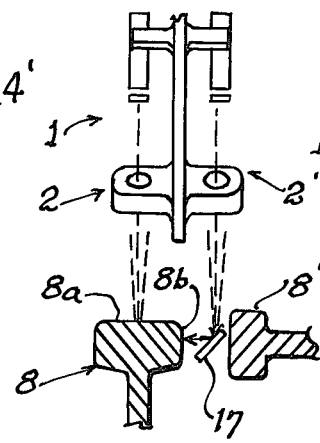
FIG. 3 shows a modified version of the range sensor units shown in FIGS. 1 and 2 where they have been moved into a vertical position and a mirror added to reflect one of the light images upon the side surface of the rail.

The top surface 8a of the rail 8 is usually quite shiny, and it may seen advantageous to orient the range sensor units such that their triangulation planes are normal to the rail surfaces 8a and 8b involved, as shown in FIG. 3, where the alignment range sensor unit 2' has a mirror 17 attached to the base 1 for folding the triangulation plane 5. This mirror would be in a precarious position, however, exposed to dirt, rain, flying debris, and being close to rail 8 and a guide rail 8' would permit only a very small variation of the position of the range sensor relative to the rail 8. Additionally, since the light image is directed against the top and side surfaces of the rail 8 in planes at right angles to these rail surfaces, specular reflections can gain access to the light receiving portion of the range sensing units unless care is taken to position the light receiving apparatus to avoid the angle at which specular reflections are directed from the rail surfaces involved. As previously indicated, specular reflections should be avoided, since rust, pitting and wear and any larger variation of the range to the rail, would cause the specular reflection to miss the lens 15 of the detection instrument. Hence, the sensors are preferably designed to operate on the comparatively weak but reliable, diffuse reflections from the rail by providing an angle of at least 5° to 10° between the optical axis L2 of the detecting instrument and the mirror image direction of the optical axis L1 of the projector, this preferably being attained or assisted by placing the optical planes of the profile and alignment sensor units at an oblique angle (preferably at least 25°) to the normal of the top and side surfaces 8a and 8b of the rail.

Means are well known for attaining a reliable signal reception in the presence of noise and background radiation. One such means is the modulation of the emitted signal and the use of filters at the output of the photocells 16a passing more or less only signals having this modulation. The light source for each of the range sensor units is preferably a laser beam source modulated by modulation means 12a to produce laser beam pulses, and a beam-position indicating means 16b is provided which responds only to the desired pulses generated by the photocells 16a and indicates beam position by responding selectively to the particular photocell struck by the beam. As previously indicated, a more sophisticated indicating system can be used, and one such system will be described. The modulated light source eliminates the effect of background light during daytime operation. A diode laser light source is particularly advantageous because of its smallness and its capability to omit very short light pulses easily detected by synchronized, gated circuits. Furthermore, the diode lasers preferably emit a narrow-band light and a corresponding narrow-band optical filter 16c is preferably used in front of the photocells 16a.

For accurate measurement of the distance to the rail, the discrete photocells 16a must be narrowly spaced and, hence, the projected light spot must be small and its size must be quite independent of the measured range. According to the invention, this is attained by each projector focusing the image of the light source not at the average range of the rail, but at or near one limit of the range variation to be covered by the sensing instrument, and by such a setting of the detecting optics that a sharp image on a photocell would be attained at or near the other limit of said range variation.

In regard to the entire foregoing description of the novel range sensor units, it shall be understood that the location and direction of the optical axes and, planes of the range sensor units are of essence only for the space between the range sensor units and the rail. Inside of th instrument, mirrors or prisms may be used to change or fold said locations and directions in any manner to gain packaging advantages, short leads, shielding, and so forth.

Figure 4:
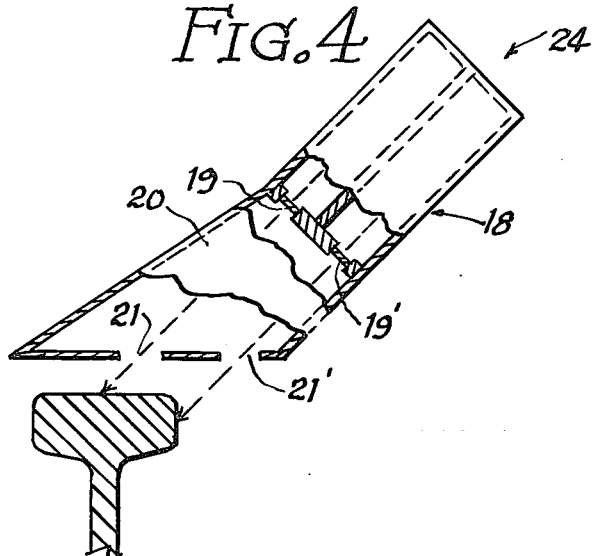
FIG. 4 is a view corresponding to FIG. 1 showing a shield carrying housing enclosing the range sensor units shown in FIG. 1.

FIG. 1 is a simplified drawing of the most basic form of the invention. As shown in FIG. 4, the range sensor units 2-2' are part of an overall range sensor assembly 24 encased in a fully sealed housing 18 filled with dry gas and having optical windows 19–19′ preferably heated to prevent fogging. Also, a shield 20 is provided having only small holes 21–21′ to receive the rail directed and rail reflected light beams to keep as much as possible rain or spray from the windows 19–19′. This shield preferably extends sufficiently far to prevent the specular reflection of sunlight from the rail surfaces from reaching the windows 19–19′.

The accurate determination of the curvature of the rail by three range measurements requires that the three range sensor units are spaced quite far apart in longitudinal direction of the track. If, as is conventional now, the sensor units are mounted on bars fastened to a truck of the car, this spacing, and therefore the attainable accuracy, are only moderate. In the present invention, the sensor units are mounted to the body of the car and distributed over a major part of the length of the car. At strongly curved, superelevated track, the horizontal and vertical distances from the rails to the locations at the car where the sensor units are mounted vary so much that the image 14 of the light source 12 would miss the rail. In order to maintain each of the sensors in sufficient closeness to the rail, the sensor units are preferably mounted for movement by servo mechanism so the light beams are kept in approximately the same position on the photocell assembly. In such case, the distances to the rail involved is indicated by the sum of the position of the sensor unit and the distance derived from the position-sensing photocells.

Figure 5:
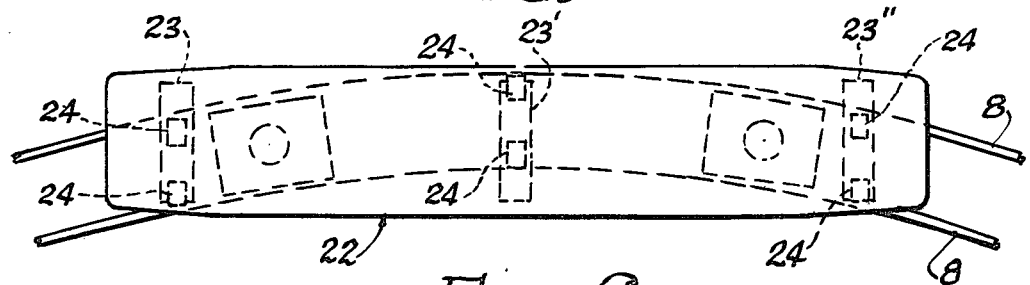
FIG. 5 is a plan view of a railroad car moving along a curved section of track and various track profile and alignment measuring stations thereon each including a range sensor unit assembly like that shown in FIG. 4 adjacent each rail of the track to provide information to determine the profile and alignment or curvature of the track.
Figure 6:
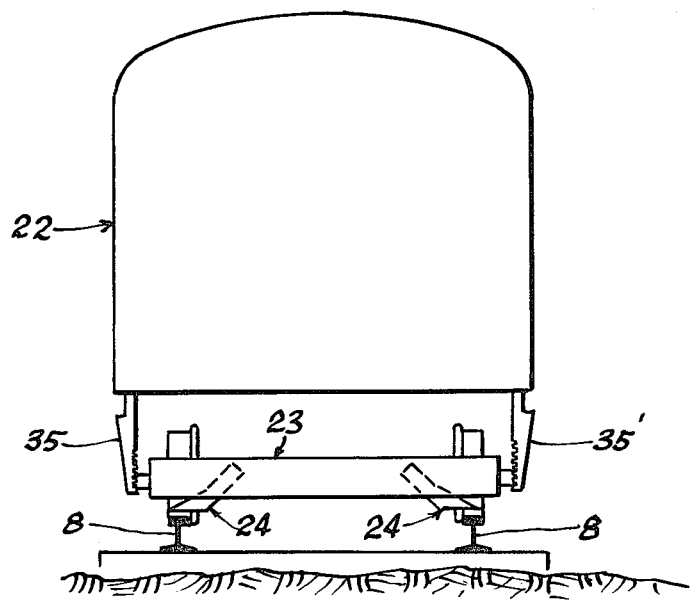
FIG. 6 is an enlarged end elevational view of the railroad car shown in FIG. 5, showing one of the track profile and alignment measuring stations shown in FIG. 5 in elevation.
Figure 7:
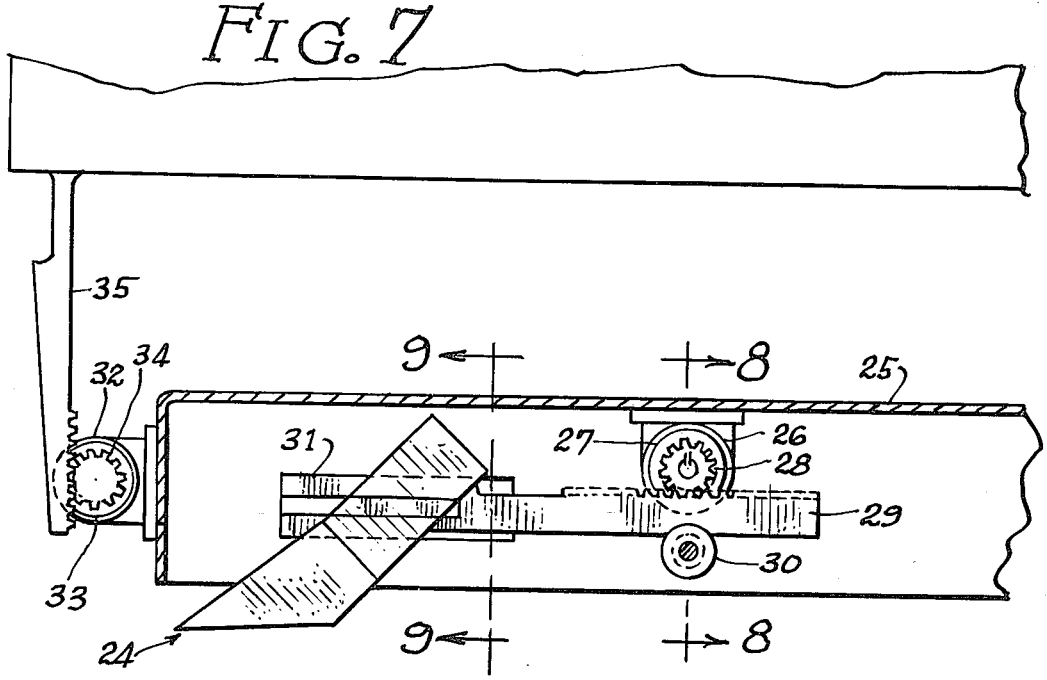
FIG. 7 is an enlarged fragmentary vertical sectional view through one end portion of the track profile and alignment measuring station shown in FIG. 6.
Figure 8:
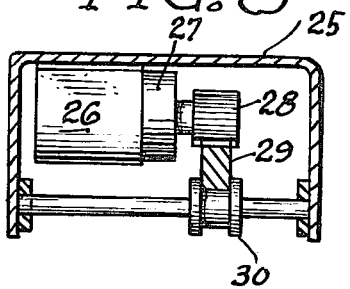
FIG. 8 is a transverse sectional view through FIG. 7, taken along section line 8—8 thereof.
Figure 9:
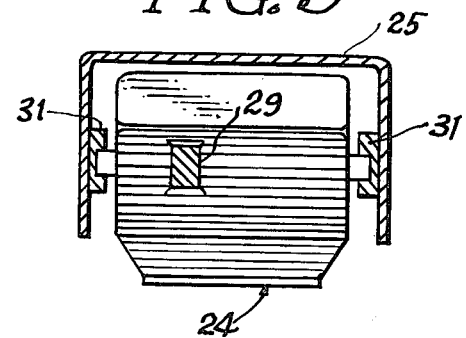
FIG. 9 is a transverse sectional view through FIG. 7, taken along section line 9—9 thereof.

FIG. 5 is a plan view of the tracks 8—8 and a railraod car 22 on which are mounted three sensor stations 23, 23′ and 23″. Each of these stations is equipped with two sensor assemblies 24, one for the right rail and the other for the left rail. Each assembly contains a profile range sensor unit 2 and an alignment range sensor unit 2′. FIG. 6 is an elevational view of the car 22, and indicates a sensor station 23 with two range sensor assemblies 24. FIGS. 7, 8 and 9 show in a schematic manner an example of the servo mechanism for moving a sensor assembly. An inverted channel member 25 extends essentially across the width of the car. A servo motor 26 is activated by the distance to the inner face of the rail as measured by the associated alignment range sensor unit 2′ and is equipped with a shaft position encoder 27 and a pinion 28 which drives a rack 29 to which the sensor assembly 24 is fastened. A flanged roller 30 guides the sides and bottom surface of the rack. The sensor assembly is also guided by rails 31 fastened to the channel 25. Another servo mechanism with motor 32, shaft position encoder 33 and pinion 34 engages rack 35 mounted to the bottom of the car body. This servo mechanism is activated by the associated profile range sensor unit 2. (An exemplary circuit for controlling each servo motor 26 will be described in connection with FIG. 11.)

The inverted channel member 25 has at the end thereof opposite that shown in FIG. 7 a mirror-image duplication of the various components there shown overlying the adjacent rail 8. Accordingly, as shown in FIG. 6, there is a rack 35′ corresponding to that previously described rack 35 and similar servo mechanism to that described which varies the elevation of the right end of the channel member 25 and spacing of the sensor assembly 24 with respect to the side surface of the rail 8 in a manner like that just described. (Because of the length of the channel member 25, the variation in the vertical position of one end of the channel member 25 will have very little effect on the opposite end thereof.)

The other sensor stations 23′ and 23″ are identical to the sensor station 23 just described.

Figure 10:
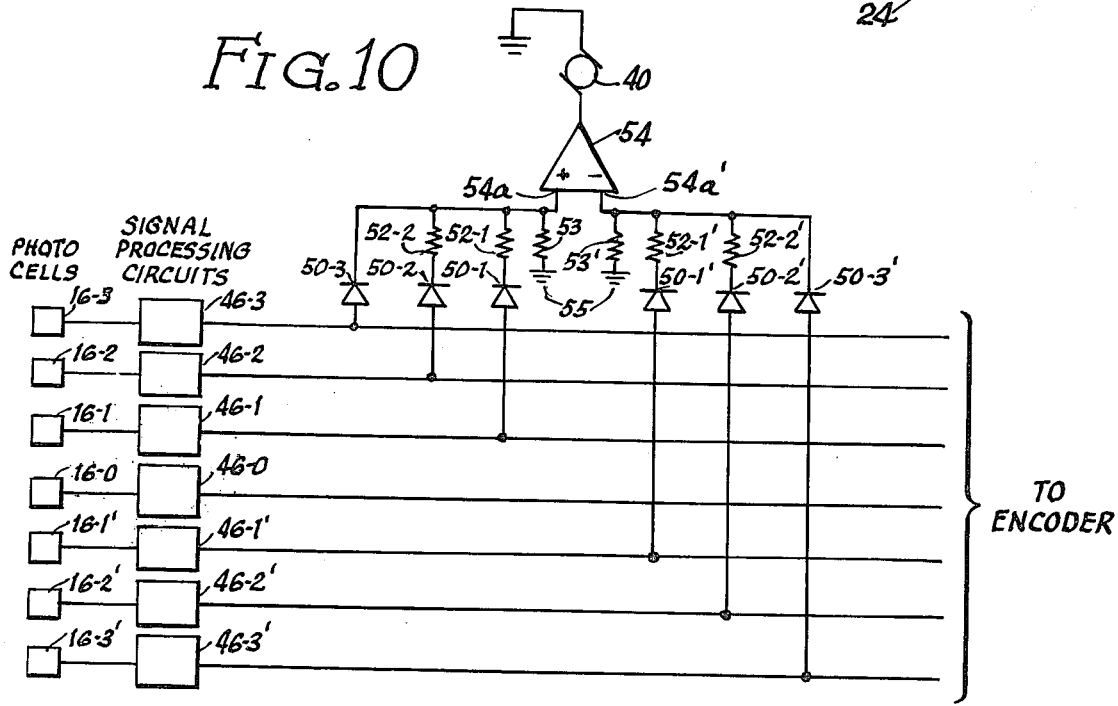
FIG. 10 is a circuit diagram of a servo motor driving circuit which can be utilized with each of the servo motors shown in FIG. 7.

In a servo motor driven system, if a range sensor unit 2 or 2′ is not at a given predetermined distance from the rail (i.e., if the light image ivolved does not fall on the center of the photocell assembly 16), the processed output of the illuminated photocell is used to power the associated servo motor to move the range sensor unit involved the desired distance from the rail. There are many ways to design such a servo system. FIG. 10 shown an exemplary servo system where a permanent-field DC motor 40 is monitored by a 7-element photocell array, where the centermost photocell of the array is identifed by reference numbers 16-0, the three photocells on one side thereof are identified by reference numbers 16-1, 16-2 and 16-3, and the three phtocells on the opposite side thereof are identified by reference numbers 16-1′, 16-2′ and 16-3′.

It is assumed that by proper focusing, the diameter of the light spot impinging on the photocell array 16 can be made approximately equal to the distance between the center of each adjacent photocell, so that the spot illuminates directly only one or at most two neighboring photocells. The outputs of the various photocells 16-0, 16-1, 16-2, 16-3, 16-1′, 16-2′ and 16-3′ are respectively coupled to signal processing circuits 46-0, 46-1, 46-2, 46-3, 46-1′, 46-2′ and 46-3′. When a light image strikes a particular photocell, the signal processing circuit associated with that photocell, will produce a finite voltage V, and when no such image strikes a particular photocell the output of the signal processing circuit will have a different level, which for the purposes of explanation will be assumed to be zero. As further shown in FIG. 10, the various outputs of the aforementioned signal processing circuits, except for the centermost processing circuit 46-0, are coupled respectively through rectifiers 50-1, 50-2, 50-3, 50-1′, 50-2′ and 50-3′ either directly or indirectly to inputs of an operational amplifier 54. The rectifiers 50-3 and 50-3-40 -0 associated with the outermost signal processing circuits 46-3 and 46-3′ are shown connected directly respectively to the plus and minus inputs 54a and 54a′ of an operational amplifier 54. The ouputs of the signal processing circuits 46-1 and 46-2 are respectively connected through resistors 52-1 and 52-2 to the positive input 54a of the operational amplifier 54, and the outputs of the signal processing circuits 46-1′ and 46-2′ are respectively connected through resistors 50 1′ and 50-2′ to the negative input terminal 54a of the operational amplifier 54. Resistors 53 and 53′ respectively extend between the positive and negative terminals 54a and 54a′of the operational amplifier 54 and a reference point for all the voltages involved, which is shown as ground 55. Resistors 53 and 53′ are of a given reference value, resistors 52-2 and 52-2′are preferably one-half this reference value and resistors 52-1 and 52-1′ are preferably twice this reference value. The various afornentioned rectifiers prevent the influence on the operational amplifier of all photocells except the photocell illuminated that is furthest from the center point of the array.

When the operational amplifier 54 receives a voltage of a given value V, the output of the operational amplifier will be of a polarity which will drive the motor 40 in one direction. When the operational amplifier 54 receives an input voltage of said given polarity on its negative input terminal 54a′, the output of the amplifier 54 will be reversed to drive the motor 40 in the opposite direction. When the centermost photocell is the only photocell which has an output, it is apparent that the amplifier 54 will receive no signals, the output of the amplifier 54 will be zero and the motor 40 will be de-energized.

Figure 11:
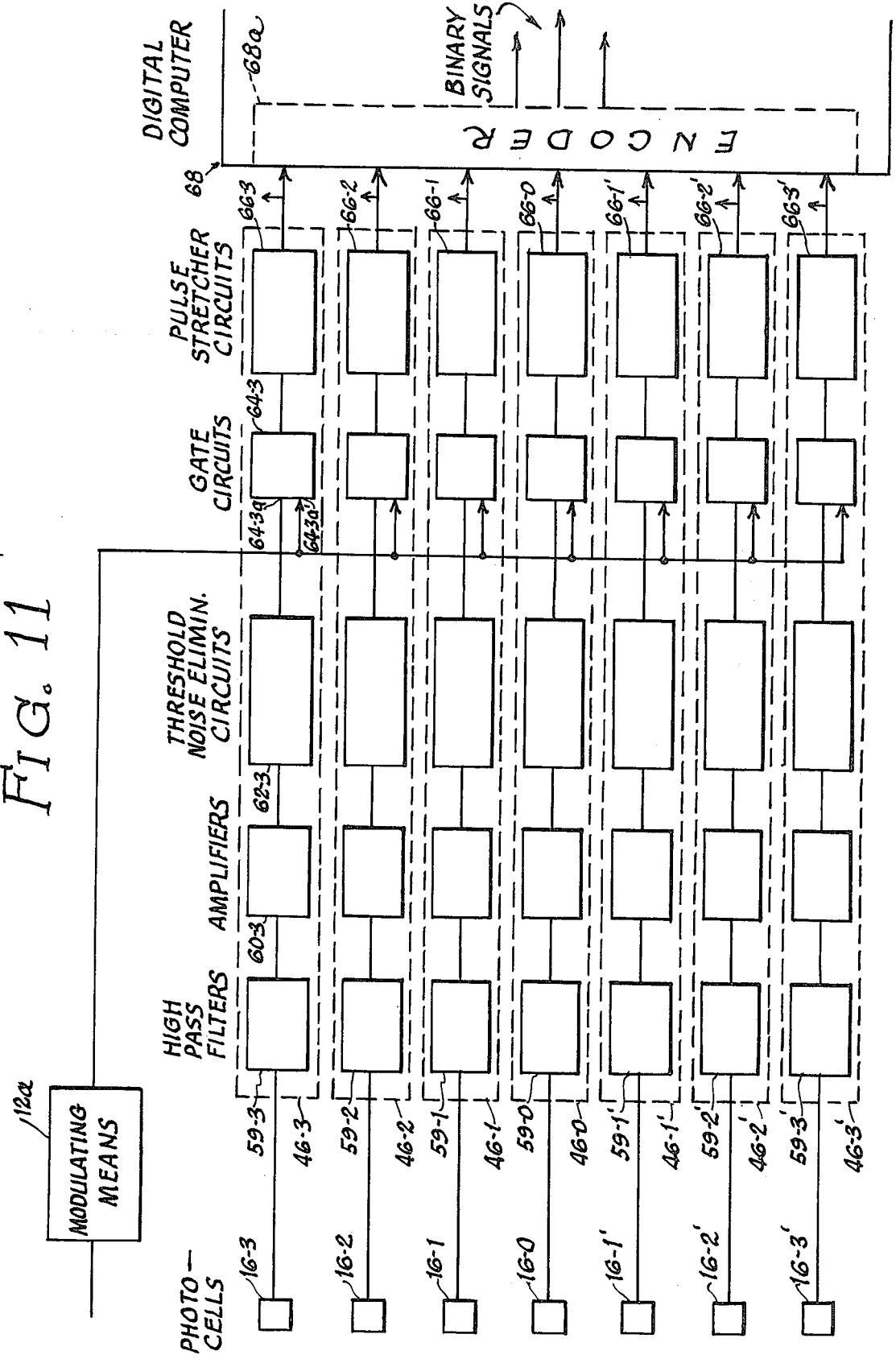
FIG. 11 is a detailed block diagram of the signal processing circuits shown in simplified block form in FIG. 10.

Each signal processing circuit is identical to the other of same, and the following description of signal processing circuit 46-3 will suffice for a description of all the other signal processing circuits referred to. Thus, as shown in FIG. 11, a high frequency pass filter 59-3 is coupled to the output of the photocell 16-3 to suppress most lower-frequency effects not related to the laser pulse before the signal is amplified in an amplifier 60-3. High frequency noise and undesired stray light caused signals are then reduced or suppressed by applying the output of the amplifier 60-3 to a threshold circuit 62-3 which only passes that portion of the input signal above a given threshold level. The output of the threshold circuit 62-3 is then fed to an input 64-3a of an "and" gate 64-3 whose other input 64-3a' is fed by the signal output (or a signal coincident with the pulsed output) of the modulator means 12a which modulates the associated laser beam light source. The gate 64-3 thus has an output during the time the laser source is energized (or a fractional part of such period) when the associate photocell 16-3 generates a voltage indicating that a light spot of significant amplitude has impinged thereon. The output of the gate 64-3 is fed to a pulse forming circuit 66-3, so that a pulse of a predetermined amplitude and width is generated from the somewhat varying output of the gate 64-3. The pulse forming circuit 66-3 may, for example, be a one shot multivibrator.

Generally, therefore, only one or at most two of the pulse forming circuits 66-1, 66-2, 66-3, 66-1', 66-2' and/or 66-3' of the various signal processing circuits referred to will have an output which is fed to the rectifiers associated with the servo motor control circuit shown in FIG. 10. The outputs of all of the pulse forming circuits are preferably fed to an encoder circuit 68a which may form part of a computer 68, to provide a binary output indicating which photocell or photocells receives a light image. The servo control system operate in response to an error signal and the focused light spot in the track shape and spacing measuring system being described will generally not be at the center of the photocell array. The outputs of the servo motor encoders thus have an error component, and if it is desired to reduce or eliminate this error, the outputs of the pulse forming circuits are converted to binary signals and combined with binary signals derived from the outputs of the servo motor driven encoders, and stored and/or analyzed in the computer to provide the desired information.

Depending upon the power of the light reflections from the rails, the quality of the optics and the accuracy requirements, it may be necessary to suppress the effect of laser-pulse-caused stray light received by those photocells which are not directly illuminated by the focused light spot. For this purpose, means are preferably provided to form stray light-signal cancellation signals. To this end, reference should be made to FIG. 12 which illustrates the basic logic diagram of a circuit for cancelling the effects of stray light signals. This circuit, which is connected between the output of the various photocells and the signal processing circuits previously described, may include circuit components which form the sum of the signal outputs of all of the photocells and then subtract from each photocell output a fraction, say 25%, of this sum, and feed the resultant signal to the associated signal processing circuit. These components may include a summing circuit 70 which has associated with it various input lines 72-0, 72-1, etc., extending to the various photocell outputs and output lines 73-0, 73-1, etc., on which signals S are each fed to signal subtracting components 71-0, 71-1, etc., which produce at the output thereof a resultant signal which is the difference between the associated main photocell output signal s0, s1, etc., and the output current signal S fed from the summing circuit 70. It can be seen that the resultant stray light signals are substantially reduced or cancelled out, whereas the signal derived from the main focused image reflection from the rail will be the only signal which will produce an output in the associated signal processing circuit.

Figure 12:
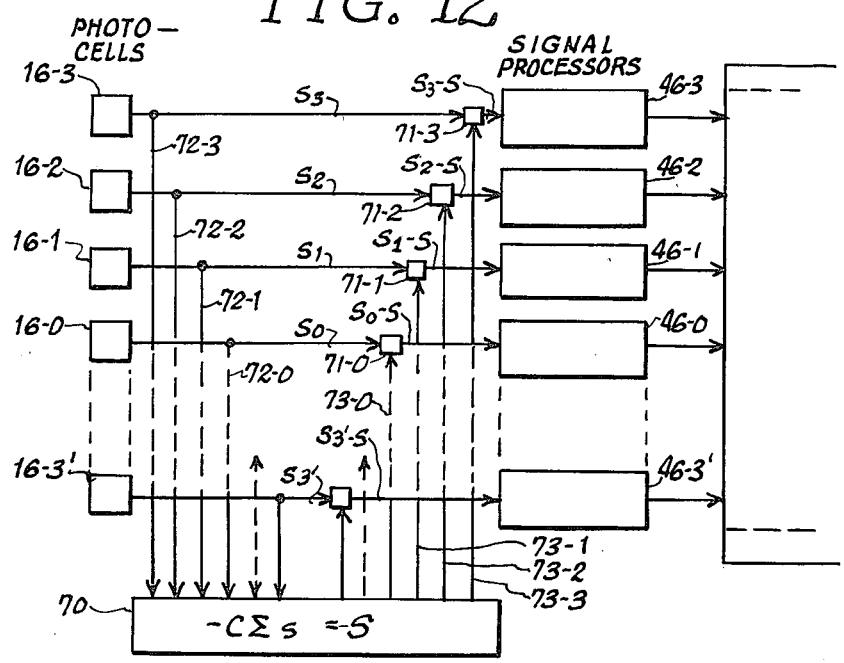
FIG. 12 is a simplified block diagram of a stray light signal cancellation circuit added to the circuit of FIG. 11.
Figure 13:
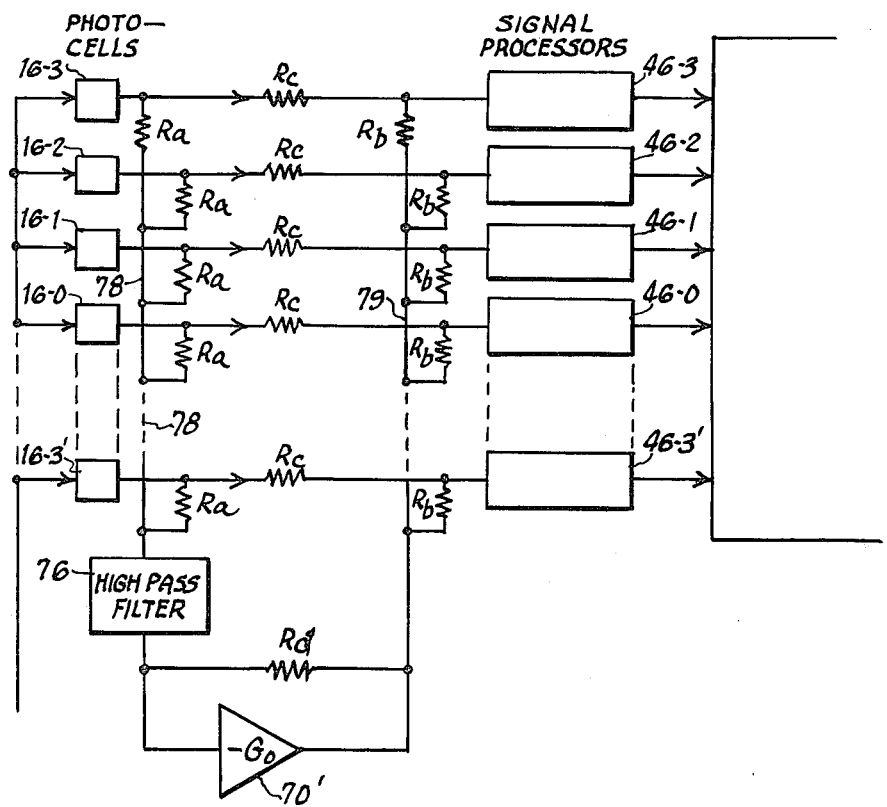
FIG. 13 is a preferred exemplary circuit for the circuit illustrated in block form in FIG. 11.

One exemplary circuit for the simplified circuit shown in FIG. 12 is shown in FIG. 13. As there shown, the functions performed by the summing circuit and the various subtraction circuits 71-0, 71-1, etc., are performed by various resistor networks associated with an open-loop high gain amplifier 70' having a negative feedback loop including a feedback resistor Rd. The input to the open-loop amplifier 70' is fed from the output of a high pass filter 76 which filers out low frequency signals. A resistor Ra is connected between each of the outputs of the photocells and a common line 78 leading to the input of the pass filter 76. Connected between the output of each of the photocells and its associated signal processing circuit is a resistor Rc, and connected between a common output line 79 of the open-loop amplifier 70' and the input to each of the signal processing circuits is a resistor Rb. The exemplary values of these various resistors are:

Ra - 10,000 ohms
Rb - 4,000 ohms
Rc - 1,000 ohms
Rd - 10,000 ohms

The high pass filter 76 may be a capacitor of 5,000 pico farads.

The present invention has provided a very reliable means for measuring track profile, alignment or curvature by various arrangements of range sensor units providing a light projection and light reflection processing means uniquely applied as explained. It should be understood that numerous modifications may be made in the most preferred forms of the ivention described without deviating from the broader aspects of the invention.

I claim:

1. In combination with a track rail with an upper section having a top and side surface on which the wheel of a railroad car rolls, a railroad car mounted for rolling movement on said track rails, the improvement in range sensor apparatus mounted on said railroad car for measuring the distance between a given point on said railroad car and said rail, said apparatus comprising: image projecton means for focusing the image of a light source on said side surface of said rail, reflected light image responsive means upon which the reflected diffuse light image is to be directed, and eflected diffuse light image receiving means for receiving the diffuse light image reflected from said rail surface, said diffuse light image receiving means including means for focusing said reflected diffuse image onto said light image responsive means, the position of the focussed reflected diffuse light image on said reflected light image responsive means being a measure of the distance between said image projection means and said rail surface, and means supporting said image projection means and image receiving means relative to one another and said surface wherein the axis along which said image is focussed on said rail surface and the axis along which said image receiving means receives a focussed diffuse reflected image for said rail surface are in a plane making an oblique angle to said surface and extending longitudinally of said track.

2. In combination with a rail along which a railroad car or the like moves and having a light reflecting planar surface and a railroad car mounted for movement along said rail, the improvement in range sensor apparatus mounted on said railroad car for measuring the distance between a given point on said railroad car and said rail, said apparatus comprising: image projection means for focusing the image of a light source on said rail, light image responsive means upon which a focussed reflected image is to be directed, diffuse reflected light image receiving means including reflected image focussing means for receiving the image reflected from said rail surface and for focusing the rail reflected image onto said reflected light image responsive means, the position of the focussed diffuse light image on said light image responsive means being a measure of the distance between said image projection means and said rail surface, and means supporting said image projection means and image receiving means relative to one another and said surface wherein the axis along which said image is focussed on said rail surface and the axis along which said image receiving means receives a focussed diffuse reflected image from said rail surface are in a plane making an oblique angle to said surface.

3. The range sensor apparatus of claim 2 wherein said reflected light-receiving means is an array of photocells spaced apart in a direction transverse to the direction in which the image impinges thereon, so that different photocells are struck by the image directed thereupon as the spacing between said image projection means and the rail surface varies, said optical sensing means producing a focused image of said light source on said photocell array of a size not much greater than the distance between adjacent photocell, and there is provided means responsive to the photocell struck by the reflected light image for indicating the distance between said image projection means and said rail surface.

4. The range sensor apparatus of claim 2 wherein said image projection means and reflected light image receiving means are positioned to direct and respond to said light image projected upon said top surface of the rail.

5. The range sensor apparatus of claim 2 wherein there is provided a sealed housing for said image projection and reflected light image receiving means, said housing including sealed window means for receiving a light image directed on and a light image reflected from said rail surface, and said first given axis and said optical axis being in a plane extending longidudinally of said track.

6. The range sensor apparatus of claim 5 wherein said housing is provided with a shield which shields said window means from stray light.

7. The apparatus of claim 2 wherein there is provided means for providing a pulsed output of said light source, gating means for receiving the resultant outputs of each of said light responsive means which gating means are opened in synchronism with the pulsing of the light source of said image projection means, so that the outputs of said light responsive means are fed through the gating means only during the pulsed operation of said light source output, pulse shaping means coupled to the outputs of said various gating means for producing a pulse of a given predetermined shape from the pulse which passes through said gating means, and means responsive to the output of said respective pulse forming for indicating the distance between said image projection means and said track surface.

8. The range sensor apparatus of claim 2 oriented in such a manner that the normal to said rail surface at the illumination point is inclined by an angle of at least about 20° to the plane between said first and second given axes.

9. The range sensor apparatus of claim 2 wherein the same is mounted for movement toward and away from said rail surface, and there is provided servo mechanism means for moving said range sensor apparatus bodily toward and away from said rail surface, said servo mechanism means including means resonsive to movement of the reflected image directed upon said light image responsive means from a reference point thereon by returning the same to said reference point.

10. The range sensor apparatus of claim 2 wherein said projection means and reflected light image receiving means are positioned to project and respond to a light image directed upon a lateral side surface of the track.

11. In combinaton with a track rail with an upper section having top and side surfaces on which the wheel of a railroad car rolls a railroad car mounted for rolling movement on said track rail, the improvement in range sensor apparatus mounted on said railroad car for measuring the distance between a given point on said railroad car and said rail, said apparatus comprising: image projection means for focusing the image of a light source and directing the same along a first given axis intersecting said top surface of said rail reflected light image responsive means upon which a reflected image is to be directed, and reflected light image receiving means including reflected image focusing means for receiving the image reflected from said rail surface along an optical axis making an angle to said first given axis and intersecting the same at or near said rail surface, and for focusing the rail reflected image onto said reflected light image responsive means, the position of the reflected light on said reflected light image responsive means being a measure of the distance between said image projection means and said rail surface, additional range sensor apparatus mounted on said railroad car including second image projection means for focusing the image of a light sources and directing the same along a third given axis intersecting said side surface of said rail, second reflected light image responsive means, second reflected light image receiving means including second reflected image focusing means for receiving the image reflected from said side rail surface along a fourth axis making an angle to said third given axis and intersecting the same at or near said rail surface, and for focusing the side rail surface reflected image onto said second reflected light image responsive means, the position of the side rail surface reflected light on said second reflected light image resonsive means being a measure of the distance between said image projection means and said side rail surface, and said first given axis and said optical axis being in a plane extending longitudinally of said track.

12. The range sensor apparatus of claim 11 wherein said image projection means and reflected image projection means and reflected image focusing means have an angular relationship such that said image focusing means receives diffuse reflections from the rail surface and is out of the path of specular reflections therefrom.

13. Range sensor apparatus for measuring distance variations to a surface between given minimum and maximum limits, said apparatus comprising: projection means for focusing the image of a light source at or adjacent to said surface along a projection axis, the focussed image having its maximum or near maximum sharpness at said surface when the spacing between said range sensor apparatus and said surface is at or adjacent to one of said limits; and optical sensing means for receiving the image reflected from said surface along an optical axis making a given angle to said first given axis and intersecting the same at or near said surface, said optical sensing means including focusing means for focusing said reflected image of the light source onto a projection plane where the light image has a miximum or near maximum sharpness when the spacing between said range sensor apparatus and said surface is at or adjacent the other of said limits, an array of light responsive means mounted on said projection plane positioned so that different ones of the light responsive means are struck by the focused light image as the spacing between said image projection means and said surface varies over given limits, each of said light responsive means producing a given signal output when said light image impinges thereon.

14. The range sensor apparatus of claim 13 wherein said image projection means and reflected image focusing means have an angular relationship such that said image focusing means receives diffuse reflections from the surface and is out of the path of specular reflections therefrom.

15. Apparatus for measuring the distance between a given point on a railroad car and the top and lateral side surfaces of a rail upon which the railroad car is mounted for rolling movement, said apparatus comprising first and second range sensor units mounted on a common frame, one of the range sensor units including image projection means for focusing a light image upon the top surface of said rail along a first given axis and the other range sensor unit including image projection means for focusing a light image upon the lateral side surface of said rail along a second given axis, said range sensor units including respectively reflected light image receiving means for receiving the associated reflected images along third and fourth given axes respectively making a substantial angle with said associated first and second given axes and intersecting the same at or near the associated top and lateral side surfaces of the rail, each of said reflected light image receiving means having focusing means for focusing the associated reflected image upon a projection plane, and light responsive means on each of said projection planes arranged so that the particular portion of the light responsive means struck by the light image projected on said projection plane varies with the spacing between the range sensor unit involved and the related top or lateral side rail surface.

16. The apparatus of claim 15 wherein said common frame is mounted for vertical movement toward and away from the top of said rail surface, servo mechanism means associated with the range sensor unit which directs a light image upon the top surface of the rail and responsive to the point of the associated light responsive means truck by the projected image for moving said common frame in a vertical direction to maintain the projected image at the same point on said associated light responsive means, said common frame also being separately supported for horizontal movement toward and away from the side rail surface, servo mechanism means associated with the range sensor unit which directs a light image upon the side surface of the rail and responsive to the point of the associated light responsive means struck by the projected image for moving said common frame in a horizontal direction to maintain the projected image at the same point on said array of the associated light responsive means.

17. The apparatus of claim 15 werein said common frame supports said image projection means and a light image receiving means so that said first and second axes, on the one hand, and said third and fourth axes, on the other hand, are in respective projection planes which make oblique angles with respect to said top and side surfaces of said rail.

18. In combination with a railroad car mounted for movement along a track, the improvement along in range sensor apparatus mounted on said railroad car for measuring the distance between a given point on said railroad car and said rail, said apparatus comprising: image projection means for focusing the image of a light source and directing the same along a first given axis intersecting a surface of said rail, light image responsive means upon which a reflected image is to be directed, reflected light image receiving means including reflected image focusing means for receiving the image reflected from said rail surface along an optical axis making an angle to said first given axis and intersecting the same at or near said rail surface, and for focusing the rail reflected image onto said reflected light image responsive means, the position of the reflected light on said reflected light image responsive means being a measure of the distance between said image projection means and said rail surface, and said projection means focusing said light image at or near one limit of the range variation to be covered by the angle sensor apparatus and said reflected image focusing means focusing said light source image on said reflected light image responsive means at or near the other limit of said range variation.

* * * * *